United States Patent [19]
Yoda

[11] 3,916,756
[45] Nov. 4, 1975

[54] COUPLING DEVICE
[75] Inventor: Tohru Yoda, Yokohama, Japan
[73] Assignee: Nifco Inc., Tokyo, Japan
[22] Filed: Feb. 21, 1974
[21] Appl. No.: 444,448

[30] Foreign Application Priority Data
Feb. 24, 1973 Japan.............................. 48-23263[U]

[52] U.S. Cl. ............... 85/8.8; 24/217; 292/DIG. 11
[51] Int. Cl.² ........................................ F16B 21/07
[58] Field of Search................ 85/8.8, 5 R, DIG. 2; 24/216, 217, 208 A; 151/41.73; 292/DIG. 11

[56] References Cited
UNITED STATES PATENTS
| | | | |
|---|---|---|---|
| 1,224,382 | 5/1917 | Isakson | 24/217 X |
| 2,610,323 | 9/1952 | Johnson | 24/217 X |
| 3,150,853 | 9/1964 | Lisbin | 151/41.73 X |
| 3,551,963 | 1/1971 | Mosher et al. | 24/216 |
| 3,741,594 | 6/1973 | Ostling | 24/217 X |

FOREIGN PATENTS OR APPLICATIONS
461,669   2/1951   Italy...................................... 24/217

Primary Examiner—Ramon S. Britts
Attorney, Agent, or Firm—Robert W. Beart; Jack R. Halvorsen

[57] ABSTRACT

Disclosed is a coupling device essentially comprising a male member and a female member. A plurality of male members are fixed to one part of a thing, for instance, a cover plate, and as many female members as male members are fixed to the counter part, for instance the casing. Then, the cover plate is fixedly but removably put on the casing.

1 Claim, 3 Drawing Figures

COUPLING DEVICE

This invention relates generally to a coupling device, and more particularly to a coupling device which allows one part of a thing to removably mate with the counter part of the thing.

The conventional coupling device comprises a male member and a female member. A plurality of male members are fixed to one part of a thing, such as a cover plate, and as many female members as male members are fixed to the counter part of the thing, such as a casing. The cover plate is fixedly and removably put on the casing by allowing the female members to accommodate and catch their male members.

In fixing the male members and the female members to associated parts of the thing it is important and necessary that these members be put in exact alignment with each other, because otherwise, separate parts of the thing cannot mate with each other. Therefore, laborious and tedious work is required in fixing the coupling device. Also disadvantageously, if one or the other part of the thing should be deformed with age, and if any misalignment between the male members and their female members should occur, the separated parts of the thing will not meet and mate with each other in a close fit.

One object of this invention is to provide such a coupling device totally free from such defects as mentioned above.

Another object of this invention is to advantageous such a coupling device which is structurally simple and advantages to mass production at a relatively low cost.

To attain these and other objects there is provided according to this invention a coupling device comprising a male member having a headed shank portion and a collar portion; a base plate having a raised portion on one major surface and a recessed portion on the other major surface; said raised portion having aperture at its center; and a female member which is generally formed in the shape of hollow cylinder and has a plurality tabs fixed to the periphery of one open end of the cylinder and converging toward the other open end in the hollow space of the cylinder, the diameter of said headed shank portion being smaller than the diameter of said aperture and the diameter of said collar portion being smaller than the diameter of said recessed portion thus allowing said male member to move somewhat in said base plate so as to self-adjust any misalignment.

This invention will be better understood from the following description of a preferred embodiment which is made with reference to the accompanying drawings in which.

Figure 1:
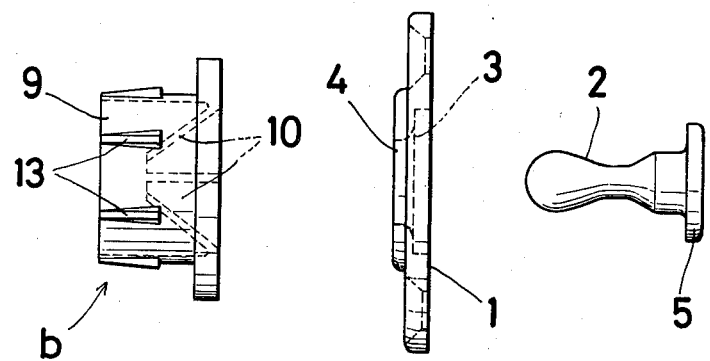
FIG. 1 is a side view each of a female member, a base plate and a male member.

Referring to the drawings, particularly to FIG. 1, 1 is a base plate to which a male member $a$ is fixed, and $b$ is a female member which is adapted to accommodate the male member when inserted therein.

As shown in the drawing, the base plate 1 is composed of a flat plate having a raised portion 4 at the center area of one major surface and a recess portion 3 on the other major surface, opposite to the raised portion. The raised portion 4 has an opening at its center.

The male member has a sphere-headed shank portion 2 and a collar portion 5. The diameter of the shank portion is somewhat smaller than the diameter of the opening of the raised portion of the base plate, whereas the diameter of the collar portion is somewhat smaller than the diameter of the recess portion of the base plate. Thus, if the male member is assembled with the base plate by inserting the shank portion of the male member in the opening of the base plate and by putting the collar portion of the male member in the recess portion of the base plate, there will be annular spaces around the shank portion and the collar portion of the male member, thus allowing the male member to move more or less in the free spaces.

Figure 2:
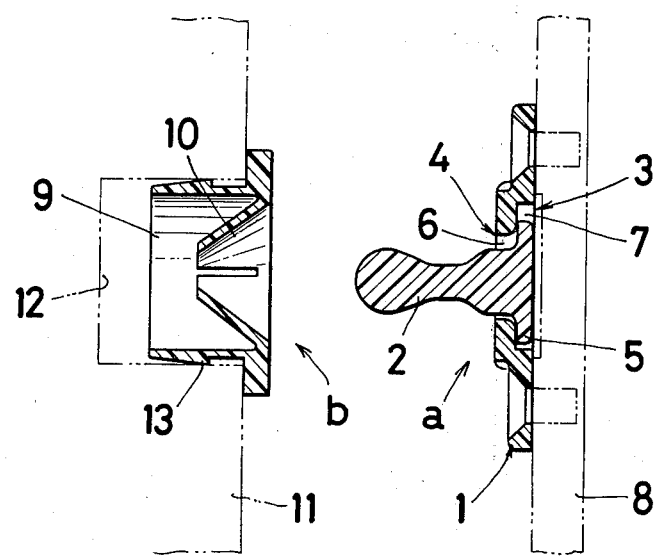
FIG. 2 shows, in section, the manner in which the female member and the male member are fixed to associated parts of a thing.

As shown best in FIG. 2, the base plate is fixed to the surface of the cover plate of a casing, for instance by means of screws, with the collar portion of the male member being contained in the recess of the base plate and the headed shank projecting through the opening of the base plate.

Figure 3:
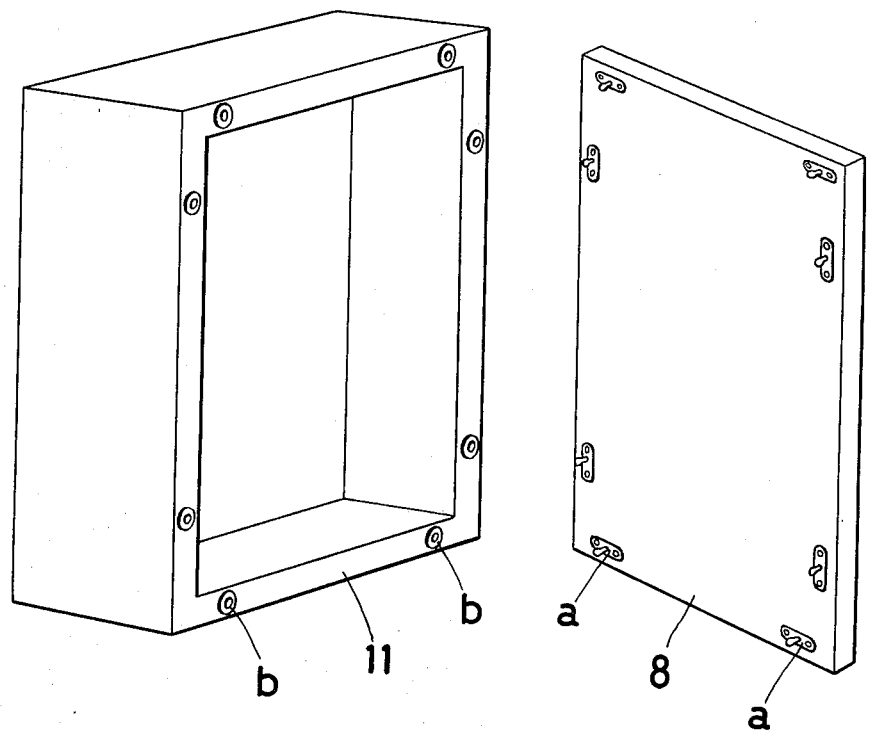
FIG. 3 is a perspective view showing the coupling devices applied to a cover plate and a casing.

A female member $b$ is composed of a cylindrical body 9 having a plurality of tabs 10 fixed to the periphery of one open end and converging in the hollow space of the cylinder. The cylindrical body has a plurality of ramp projections 13 on its outer periphery, thus allowing the female member $b$ to fixedly fit in a hole 12, which is made on the periphery of the casing, as shown in FIGS. 2 and 3.

When the male member is inserted in the female member, the tabs are yieldingly bent to allow the headed shank portion of the male member to pass, and then the tabs return to the original converging state to resiliently catch and prevent the headed shank portion of the male member from slipping out.

As is readily understood from the above, a plurality of male members are fixed to, for instance, the cover plate of a casing and as many female members as male members are fixed to the casing, and then the cover plate is put on the casing by allowing the male members to fixedly fit in the female members. The cover plate is removably fixed to the casing. The male shank can move somewhat in the base plate in a plane parallel to the major surface of the cover plate, and therefore when the male member is inserted in the female member, the male member can perform self-alignment with the female member by guiding the headed shank along the converging tabs of the female members. Therefore, it is unnecessary that the cover plate be put in exact alignment with the casing beforehand. Also advantageously, even if the cover plate and or the casing should be somewhat deformed with age so that misalignment between the male members and the female members should result, it will cause on adverse effect in putting the cover plate on the housing. More specifically, it does not happen that some of the male members fail to meet and fit in their female members as a result of misalignment caused by deformation in the cover plate and or the casing. Thanks to this capability to self-adjust for misalignment, the connecting device according to this invention does not at the time of the fixing work require such exact alignment between male and female members as the conventional mating device does.

The coupling device according to this invention can be moulded of a plastic material at a relatively low cost. Also, it can be made of a metal.

What is claimed is:

1. A plastic coupling device comprising: a male member having a headed shank portion and a collar portion at the other end thereof, said headed shank portion including a bulbous head connected to a reduced diameter portion to provide an annular recess intermediate the bulbous portion and said collar portion, a base plate having a raised portion on one major surface and a recessed portion on the other major surface thereof, said raised portion having an aperture at its center, the diameter of said annular recess on said headed shank portion as well as said bulbous head being smaller than the diameter of said aperture and the diameter of said collar portion being smaller than the diameter of said recessed portion but larger than said aperture to thereby permit said male member to move freely in all directions relative to said base plate and compensate for misalignment with a mating female member, said female member generally formed in the shape of an open ended hollow cylinder with a rigid annular laterally outwardly extending collar portion integrally connected to the periphery of one open end thereof, a plurality of resilient tabs formed integral with and on the other periphery of said cylinder spaced axially from said annular collar portion and converging toward the other open end in the hollow space of the cylinder, said tabs forming a split frustoconical section having a wall thickness less than the thickness of the annular collar portion whereby said tabs are capable of flexing independently of the hollow cylinder forming the female member, said hollow cylinder having a plurality of integral circumferentially spaced ramp-like projections adjacent the said other open end and adapted to engage the wall of a hollow bore adapted to accept said cylindrical female member, said member capable of independent flexing from the flexing of said tabs whereby insertion of the headed member into the female member will not disturb the cooperation between the female member and the blind bore in which it is mounted.

* * * * *